(12) United States Patent
Mattioli et al.

(10) Patent No.: US 10,189,595 B2
(45) Date of Patent: Jan. 29, 2019

(54) FEEDING UNIT FOR FEEDING SEALED PACKS OF POURABLE FOOD PRODUCTS

(71) Applicant: TETRA LAVAL HOLDINGS & FINANCE S.A., Pully (CH)

(72) Inventors: Giorgio Mattioli, Modena (IT); Richard John Pedretti, Formigine (IT); Dino Neri, Modena (IT); Massimo Pradelli, Reggio Emilia (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/309,084

(22) PCT Filed: May 28, 2015

(86) PCT No.: PCT/EP2015/061783
§ 371 (c)(1),
(2) Date: Nov. 4, 2016

(87) PCT Pub. No.: WO2015/189037
PCT Pub. Date: Dec. 17, 2015

(65) Prior Publication Data
US 2017/0073103 A1    Mar. 16, 2017

(30) Foreign Application Priority Data

Jun. 10, 2014 (EP) .................................. 14171685

(51) Int. Cl.
*B65B 9/20* (2012.01)
*B65B 51/30* (2006.01)
(Continued)

(52) U.S. Cl.
CPC .............. *B65B 61/28* (2013.01); *B65B 61/06* (2013.01); *B65B 61/24* (2013.01); *B65G 19/02* (2013.01); *B65B 9/20* (2013.01); *B65B 51/30* (2013.01)

(58) Field of Classification Search
CPC ......... B65B 61/06; B65B 61/24; B65B 61/28; B65B 9/20; B65B 51/30; B65G 19/02
(Continued)

(56) References Cited

U.S. PATENT DOCUMENTS 3,857,223 A    12/1974  Dominici
4,108,300 A *   8/1978  Hayase .................. B65B 43/26
                                                       198/470.1
(Continued)

FOREIGN PATENT DOCUMENTS

DE          1 296 074 B      5/1969
DE       198 08 789 A1       9/1999
(Continued)

OTHER PUBLICATIONS

International Search Report (PCT/ISA/210) dated Jul. 24, 2015, by the European Patent Office as the International Searching Authority for International Application No. PCT/EP2015/061783.
(Continued)

*Primary Examiner* — Mark A Deuble
(74) *Attorney, Agent, or Firm* — Buchanan Ingersoll & Rooney PC

(57) ABSTRACT

A feeding unit for receiving sealed packs of pourable food products from a forming unit arranged to form the packs and feed the packs to a folding unit arranged to fold the packs so as to obtain folded packages, the feeding unit comprising a feeding conveyor to carry the packs towards the folding unit, wherein the feeding unit further comprises a driving arrangement interacting with the packs so as to pull the
(Continued)

packs from the forming unit and push the packs towards the feeding conveyor.

19 Claims, 9 Drawing Sheets

(51) Int. Cl.
  *B65B 61/06* (2006.01)
  *B65B 61/24* (2006.01)
  *B65B 61/28* (2006.01)
  *B65G 19/02* (2006.01)

(58) Field of Classification Search
  USPC .......................................... 198/626.1–626.6
  See application file for complete search history.

(56) References Cited

U.S. PATENT DOCUMENTS

| | | | | |
|---|---|---|---|---|
| 4,798,281 A | * | 1/1989 | Egger | .................... B65G 15/14 |
| | | | | 198/626.5 |
| 5,505,037 A | | 4/1996 | Terminella et al. | |
| 5,768,852 A | * | 6/1998 | Terminella | ................ B65B 9/20 |
| | | | | 53/133.4 |
| 5,775,068 A | * | 7/1998 | Strasser | .................. B65B 9/073 |
| | | | | 198/626.1 |
| 5,966,899 A | | 10/1999 | Fontanazzi | |
| 6,213,290 B1 | | 4/2001 | Biondi et al. | |
| 7,124,877 B2 | * | 10/2006 | Honegger | .............. B65H 29/12 |
| | | | | 198/608 |
| 7,156,222 B2 | * | 1/2007 | Schnuelle | ............... B65B 43/14 |
| | | | | 198/626.3 |
| 9,919,873 B2 | * | 3/2018 | Santi | ..................... B65G 19/265 |
| 2001/0029721 A1 | | 10/2001 | Sato et al. | |
| 2010/0180554 A1 | | 7/2010 | Rapparini | |
| 2013/0277176 A1 | * | 10/2013 | Corlett | .................. B65G 17/44 |
| | | | | 198/626.1 |
| 2014/0131173 A1 | | 5/2014 | Pedretti et al. | |

FOREIGN PATENT DOCUMENTS

| | | |
|---|---|---|
| EP | 1 145 961 A | 10/2001 |
| EP | 2 586 715 A1 | 5/2013 |
| RU | 2161582 C2 | 1/2001 |
| RU | 2228686 C2 | 5/2004 |
| WO | WO 2009/010811 A1 | 1/2009 |
| WO | WO 2010/084660 A1 | 7/2010 |

OTHER PUBLICATIONS

Written Opinion (PCT/ISA/237) dated Jul. 24, 2015, by the European Patent Office as the International Searching Authority for International Application No. PCT/EP2015/061783.

Decision to Grant issued by the Russian Patent Office dated Sep. 14, 2018 in corresponding Russian Patent Application No. 2016152302, and English language translation of the Decision to Grant (13 pages).

\* cited by examiner

FEEDING UNIT FOR FEEDING SEALED PACKS OF POURABLE FOOD PRODUCTS

TECHNICAL FIELD

The present invention relates to a feeding unit for receiving sealed pillow-shaped packs of pourable food products from a forming unit arranged to form the packs and feed the packs to a folding unit arranged to fold the packs so as to obtain folded packages.

BACKGROUND OF INVENTION

As is known, many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated sheet packaging material.

The packaging material has a multilayer structure substantially comprising a base layer for stiffness and strength, which may comprise a layer of fibrous material, e.g. paper, or of mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminum foil or ethyl vinyl alcohol (EVOH), which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The packaging machines comprise a forming unit, wherein the tube is filled continuously downwards with the sterilized or sterile-processed food product, and is sealed and then cut along equally spaced cross sections to form pillow packs, which are then fed to a folding unit to form the finished, e.g. substantially parallelepiped-shaped packages.

More specifically, the pillow packs substantially comprise a parallelepiped-shaped main portion; and a top end portion and a bottom end portion, opposite to each other and projecting laterally on opposite sides of the main portion and defining respective triangular end flaps to be folded onto the main portion.

A longitudinal sealing strip, formed when sealing the packaging material to form the vertical tube, extends along the pillow packs; and the top end portion and bottom end portion of each pillow pack have respective transverse sealing strips perpendicular to the longitudinal sealing strip and defining respective end flaps projecting from the top and bottom of the pack.

The top end portion and the bottom end portion of each pillow pack taper towards the main portion from the respective end flaps.

Folding units are known, substantially comprising a chain conveyor for feeding pillow packs continuously along a predominantly straight horizontal forming path from a supply station to an output station, and a plurality of folding devices which cooperate cyclically with each pillow pack along the forming path to flatten the respective top end portion and bottom end portion of the pillow pack and so fold the respective end flaps onto the top end portion and bottom end portion.

The folding units comprise heating means arranged for heating the pillow packs and melting the plastic material forming the outer plastic layer of the pillow packs at the top end portion and bottom end portion.

In practice, the pillow packs are usually formed and sealed with their longitudinal axis arranged vertically. The newly formed pillow packs are subsequently cut from the tube and let slide along a curved-profile chute so as to be brought from the vertical position to a substantially horizontal position, in which they are received by a feeding unit, arranged immediately downstream of the chute and which drives the pillow packs to the folding unit.

Once the pillow packs are cut from the tube, they move down to the chute and advance along the chute by gravity.

The feeding unit comprises two guides that extend between an inlet zone, where the packs coming from the chute are received, and an outlet zone, where the packs are delivered to the folding unit.

The feeding unit further comprises a conveyor belt and a plurality of carriers projecting from the conveyor belt and arranged to interact with the packs to advance the packs along the guides.

The conveyor belt is wounded around a first wheel and a second wheel, the first wheel and the second wheel having substantially horizontal axes. In this way, the conveyor belt has an upper active branch and a lower return branch, the carriers of the upper active branch passing through a gap defined between the two guides and pushing the packs.

A drawback of the known packaging machines is that the packs coming from the forming unit may be not synchronised with the feeding unit.

In particular, the packs may be "delayed" due to different factors such as: sticking to the sealing device that carries out the transversal sealing or to the cutter that separates the packs form the tube.

It may therefore happen that—when a carrier reaches the inlet zone—the corresponding pack has not arrived yet and so such carrier is not able to carry any pack. In this case, the following carrier interacts with two packs, i.e. its "own" pack and the "delayed" pack that was not delivered to the preceding carrier. This may cause a jam in the feeding unit or in the folding unit.

It may also happen that—when a pack reaches the inlet zone—the corresponding carrier interacts with an intermediate portion of the pack, instead of an end portion of the pack. In this way, the carrier may crush the pack and damage it.

The above-mentioned drawbacks are particularly relevant in case of high speed packaging machines in which the speed of the conveyor belt is high and the distance between adjacent carriers is small, which makes extremely critical a lack of synchronization between the packs coming from the forming unit and the conveyor belt.

DISCLOSURE OF INVENTION

An object of the invention is to improve the known packaging machines, in particular the feeding units that receives the packs from the forming unit and transfer the packs to the folding unit.

Another object of the invention is to improve the synchronization of the packs coming from the forming unit with the carriers of the feeding unit.

Another object of the invention is to provide a feeding unit in which the delay with which a pack reaches a corresponding carrier is reduced, or eliminated.

Another object of the invention is to provide a feeding unit that is efficient and reliable even when used in high speed packaging machines.

According to the invention, there is provided a feeding unit for receiving sealed packs of pourable food products from a forming unit arranged to form the packs and feed the packs to a folding unit arranged to fold the packs so as to obtain folded packages, as claimed in claim 1.

BRIEF DESCRIPTION OF THE DRAWINGS

Some preferred, non-limiting embodiments of the invention will be described by way of example with reference to the accompanying drawings, in which.

DETAILED DESCRIPTION OF PREFERRED EMBODIMENTS

Figure 1:
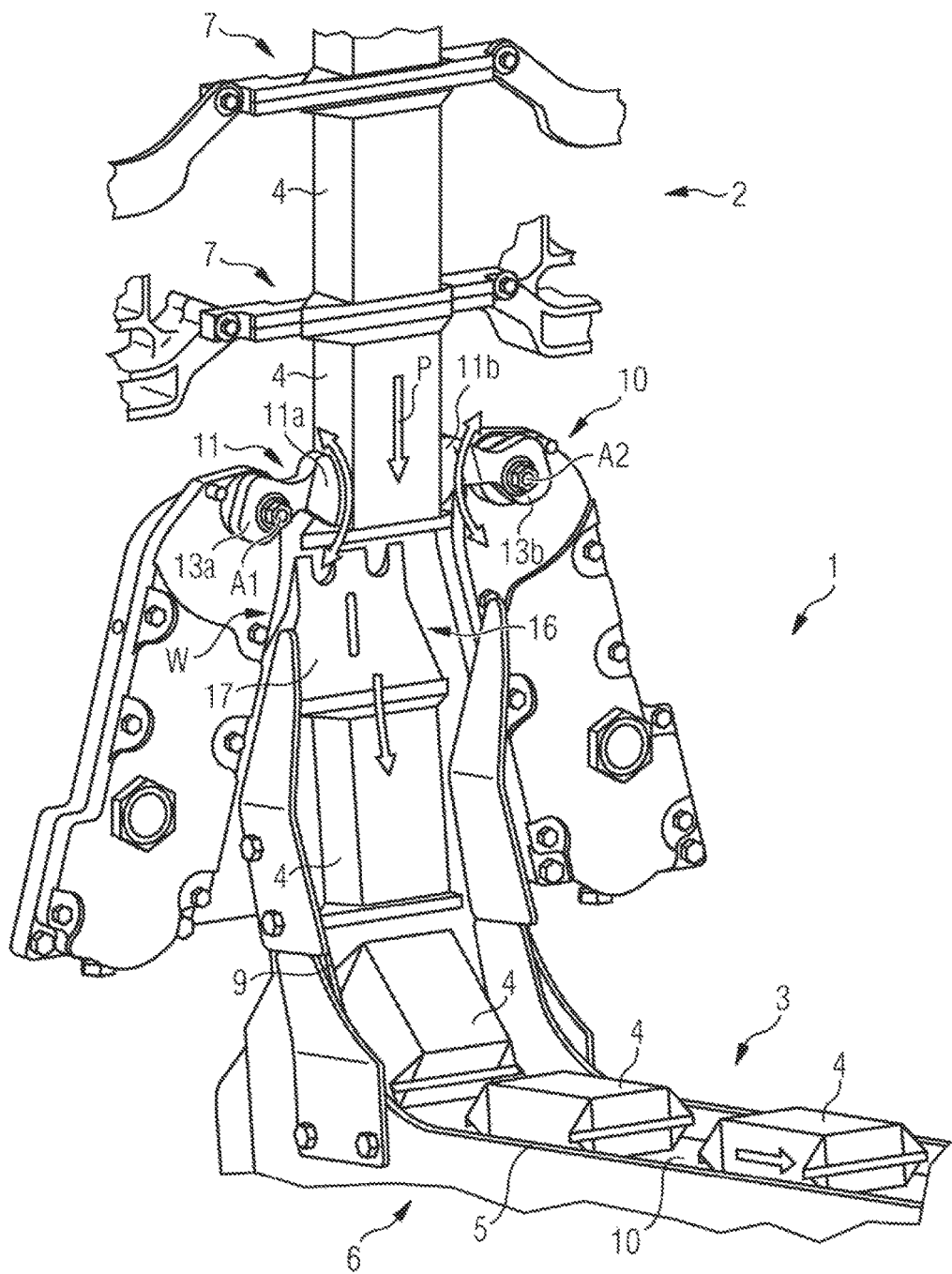
FIG. 1 is a perspective view of a feeding unit according to the invention.
Figure 2:
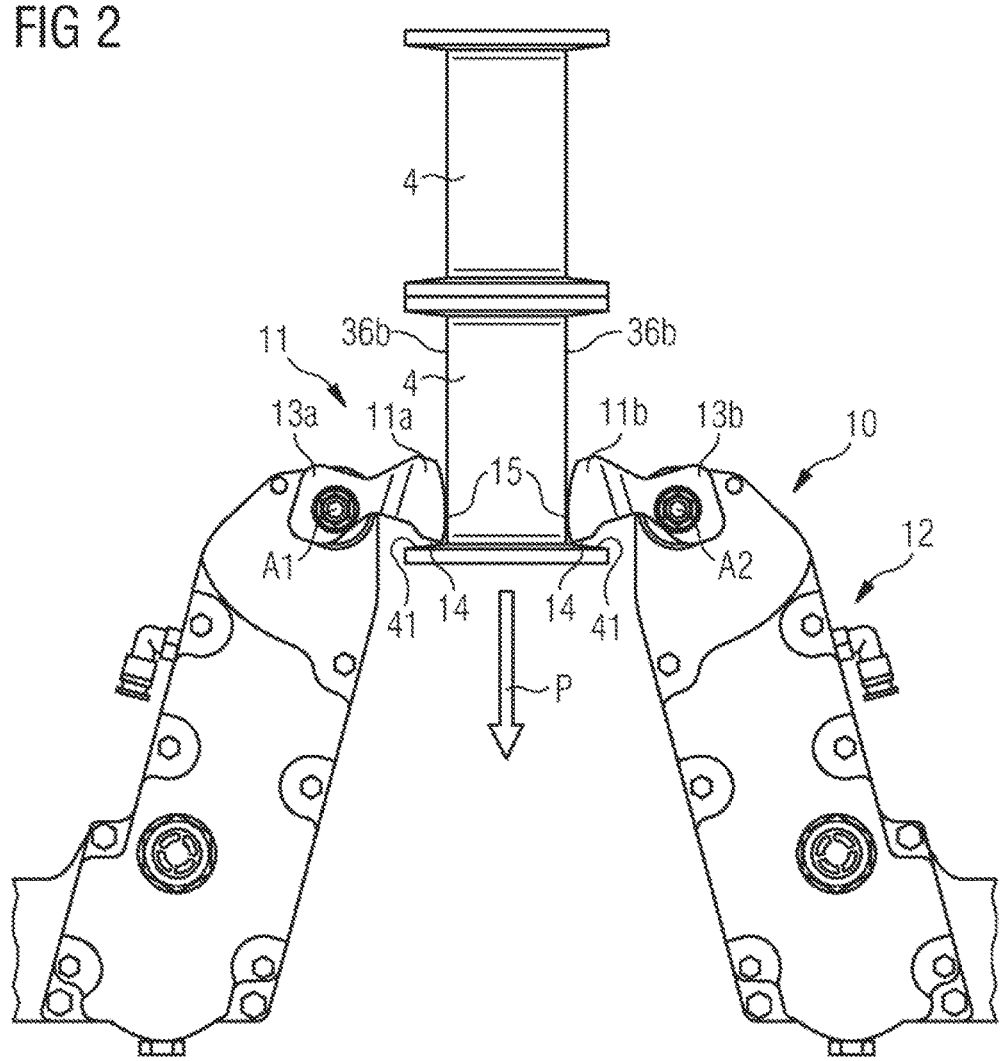
FIG. 2 is a front view of an embodiment of a driving arrangement of the feeding unit of FIG. 1.

With reference to FIGS. 1 and 2, a packaging machine 1 is shown comprising a forming unit 2, a folding unit (not shown) and a feeding unit 3 interposed between the forming unit 2 and the folding unit.

The forming unit 2 folds, fills and seals a packaging material to obtain pillow-shaped packs 4. In particular, the forming unit 2 continuously produces the packs 4 from a tube of packaging material (not shown).

The tube is formed in known manner by longitudinally folding and sealing a web of heat-seal sheet material which may comprise a base layer for stiffness and strength, which may be formed by a layer of fibrous material, e.g. paper, or of mineral-filled polypropylene material, and a number of layers of heat-seal plastic material, e.g. polyethylene film, covering both sides of the base layer. In the case of an aseptic package for long-storage products, such as UHT milk, the packaging material may also comprises a layer of gas- and light-barrier material, e.g. an aluminum foil or an ethyl vinyl alcohol (EVOH) foil, which is superimposed on a layer of heat-seal plastic material, and is in turn covered with another layer of heat-seal plastic material forming the inner face of the package eventually contacting the food product.

The tube of packaging material is then filled with the food product, and is sealed and cut along equally spaced cross sections to form the packs 4.

Figure 3:
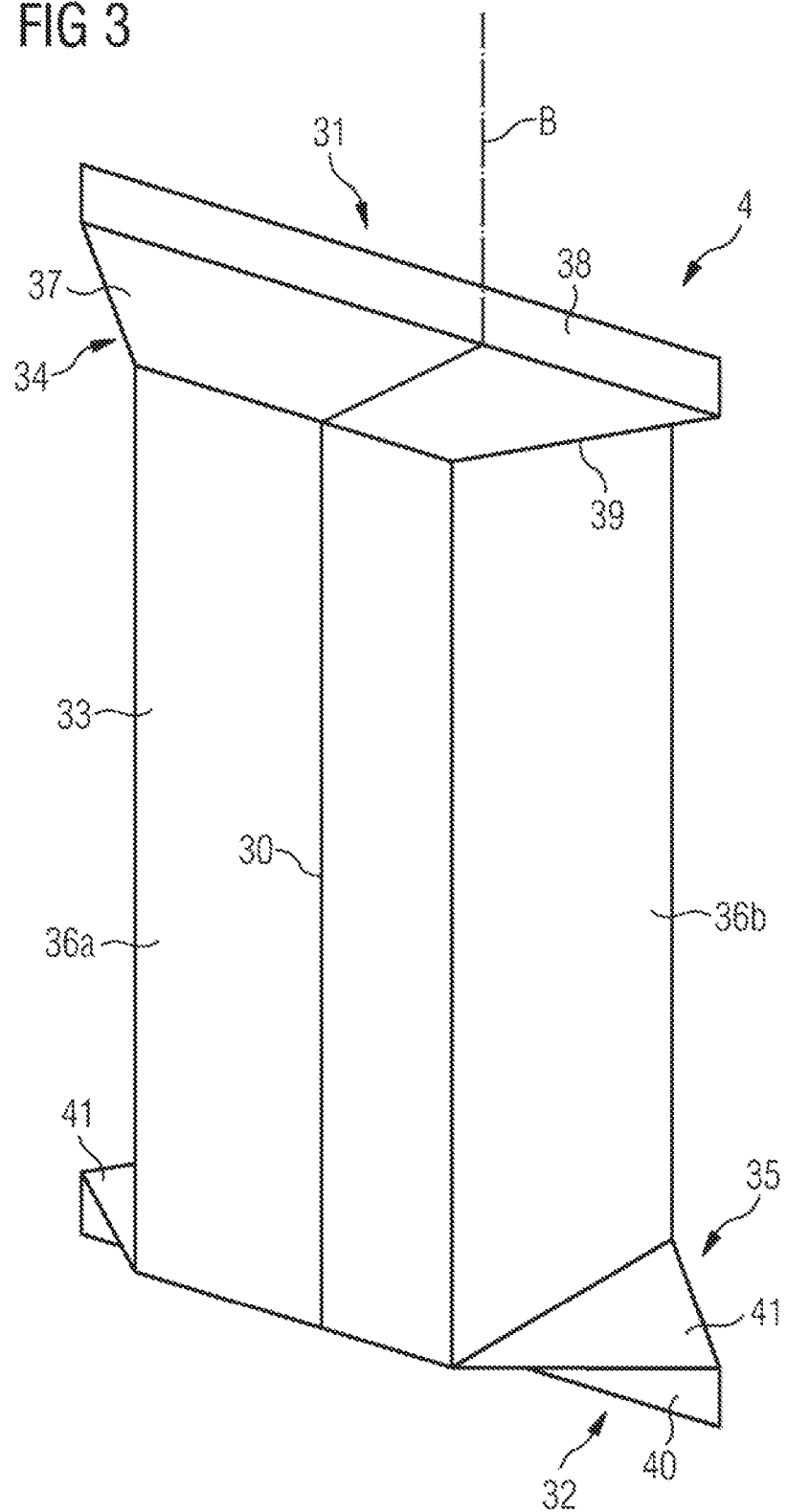
FIG. 3 is a perspective view of a pack to be handled by the feeding unit of FIG. 1.

With reference to FIG. 3, an embodiment of a pack is shown which has a longitudinal sealing band 30, formed to produce the tube of packaging material from the web folded into a cylinder, extends along one side of the pack 4, which is closed at opposite ends by a first transversal sealing band 31 and a second transversal sealing band 32 perpendicular to and joined to the longitudinal sealing band 30.

Each pack 4 has an axis B, and comprises a main body 33, a first end portion 34 and a second end portion 35 tapering from the main body 33 towards the respective first transverse sealing band 31 and second transverse sealing band 32.

The main body 33 of the pack 4 is bounded laterally by two first lateral walls 36a and two second lateral walls 36b which are alternate to each other.

The first end portion 34 and the second end portion 35 are each defined by two walls 37, each substantially in the form of an isosceles trapezium, which slope slightly towards each other with respect to a plane perpendicular to axis B, and have minor edges defined by opposite edges of respective wall 36a, and major edges joined to each other by the respective first transversal sealing band 31 and second transversal sealing band 32.

The longitudinal sealing band 30 extends between the first transverse sealing band 31 and the second transverse sealing band 32, and along the whole of one wall 36a and the corresponding walls 37 on the same side as the wall 36a.

The first end portion 34 comprises a substantially elongated rectangular first end fin 38, formed by the first transversal sealing band 31, and projecting in the direction of axis B from the pack 4; and two substantially triangular first flaps 39, projecting laterally on opposite sides of the main body 33, and defined by end portions of the walls 37 and by corresponding triangular end portions of the lateral walls 36b.

Similarly, the second end portion 35 comprises a substantially elongated rectangular second end fin 40, formed by the second transversal sealing band 32, and projecting in the direction of axis B from the pack 4; and two substantially triangular second flaps 41, projecting laterally on opposite sides of the main body 33, and defined by end portions of the walls 37 and by corresponding triangular end portions of the lateral walls 36b.

More precisely, each of the first end fin 38 and the second end fin 40 extends along a direction orthogonal to axis B.

To form a package from a pack 4 the folding unit presses the first end portion 34 and the second end portion 35 down flat towards each other, and at the same time folds the first end fin 38 onto the flattened first end portions 34 and the second end fin 40 onto the flattened second end portion 35.

The folding unit folds the second flaps 41 onto top ends of respective walls 36b towards the first end portion 34 and folds the first flaps 39 onto the previously folded first end fin 38, on the opposite side of the second end portion 35.

The feeding unit 3 receives the packs 4 from the forming unit 2 and transfers the packs 4 to the folding unit.

The feeding unit 3 comprises a feeding conveyor 6 having a flexible conveying element (not shown) and a plurality of carrying elements (not shown) projecting from the flexible conveying element and arranged for pushing the packs 4 towards the folding unit.

The feeding unit 3 further comprises a guide arrangement 5 which receives the packs 4 and on which the packs 4 are caused to slide by the carrying elements.

The feeding unit 3 further comprises a chute 9 receiving the packs 4 from the forming unit and directing the packs 4 towards the feeding conveyor 6. The chute 9 receives the packs 4 with the axis B arranged in a substantially vertical direction and releases the packs 4 with the axis B arranged in a substantially horizontal direction.

In the forming unit the tube of packaging material is sealed by sealing devices 7 so as to obtain the first transverse sealing band 31 and the second transverse sealing band 32. Once the pack 4 has been sealed, a cutting device 8 (schematically shown in FIGS. 4 and 5) separates the pack 4 from the tube. The pack 4, therefore, moves towards the chute 9 under the action of its own weight, i.e. by gravity.

The feeding unit 3 further comprises a driving arrangement 11 interacting with the packs 4 so as to pull the packs 4 coming from the forming unit and to push the packs 4 towards the feeding conveyor 6.

The driving arrangement 10 comprises a couple of cyclically movable driving elements 11 positioned on opposite sides of an advancing path P along which said packs 4 are advanced through the feeding unit 3.

The driving arrangement 10 further comprises an actuating arrangement 12 for moving said driving elements 11.

The actuating arrangement 12 comprises a first rotatable body 13a and a second rotatable body 13b arranged on opposite sides of the advancing path P.

The first rotatable body 13a rotates about a first rotation axis A1 and carries a first driving element 11a of said driving elements 11. The first rotation axis A1 is substantially horizontal.

The second rotatable body 13b rotates about a second rotation axis A2 and carries a second driving element 11b of said driving elements 11. The second rotation axis A2 is substantially horizontal.

The actuating arrangement 12 comprises a first actuating element 12a that moves the first rotatable body 13a.

The actuating arrangement 12 further comprises a second actuating element 12b that moves the second rotatable body 13b.

The first actuating element 12a comprises a first motor device and, possibly, a first gearbox to rotate the first rotatable body 13a.

The second actuating element 12b comprises a second motor device and, possibly, a second gearbox to rotate the second rotatable body 13b.

The first motor device and the second motor device are synchronized so that the first driving element 11a and the second driving element 11b interact with the pack 4 substantially at the same time.

As an alternative, a single motor device can rotate both the first rotatable element 13a and the second rotatable element 13b through a transmission.

The driving elements 11 have active regions 14 that interact with the second flaps 41 of the pack 4 and direct the pack 4 towards the conveying unit 6.

The driving elements 11 also have active surfaces that are shaped as an arc of a circumference and interact with the second lateral wall 36b of the pack 4. In this way, the active surfaces 14 remains in contact with the second lateral walls 36 for a certain time. The driving elements 11, therefore, provide a guiding action for the pack 4 along the advancing path P.

The actuating arrangement 12 rotates the driving elements 11 at a rotating speed that is greater—at least during interaction with the packs 4—than the advancing speed at which the packs 4 move, under the action of their own weight, i.e. by gravity, from the forming unit to the feeding unit 3.

In this way, the driving elements 11 generate an impact on the packs 4 and accelerate the packs 4 towards the feeding unit 3.

In one embodiment, the rotating speed is constant.

In another embodiment, the rotating speed is variable, the speed being lower when the driving elements 11 interact with the packs and higher during the remaining portion of the rotation.

During operation, a pack 4 is produced by folding the packaging material, forming the tube, filling the tube with a food product and sealing the tube.

The cutting device 8 cuts the tube and separates the pack 4 from the tube.

The driving elements 11 pull down the pack 4 and push the pack 4 towards the chute 9.

The pack 4 is then advanced to the feeding conveyor 6.

Owing to the invention it is possible to obtain a feeding unit that allows good synchronization of the packs 4.

The driving arrangement, in fact, interacts with the packs 4 and provides a driving action on the packs 4 so as to synchronize the packs with the feeding conveyor 6. The driving arrangement 10 assures that the packs 4 are in the right position—at the right time—to be correctly engaged by the carrying elements of the feeding conveyor 6.

In other words, the driving action compensates for the possible "delay" of the packs 4.

In the known feeding unit the movement of the packs from the forming unit to the feeding conveyor is not controlled, since the packs move from the forming unit to the feeding conveyor only due to their weight, i.e. by gravity.

On the contrary, in the feeding unit according to the invention, owing to the driving arrangement 10, the frequency with which the packs 4 are delivered to the feeding conveyor 6 is substantially constant.

As shown in FIG. 1, the feeding unit 3 comprises a discarding arrangement 16 for discarding possible defective packs 4, for instance during set up of the packaging machine or for other needs connected to the production cycle.

The discarding arrangement 16 is positioned between the forming unit and the feeding conveyor 6. In particular, the discarding arrangement 16 is positioned upstream of the chute 9.

The discarding device 16 comprises a guiding plate 17 movable between a working position W (shown in FIG. 1) and a discarding position (not shown).

In the working position W the guiding plate 17 is substantially aligned with the advancing path P and so directs the packs 4 towards the chute 9.

In the discarding position the guiding plate 17 is arranged transversally to the advancing path P and so directs the packs 4 towards a discarding conveyor (not shown).

As disclosed above, when the driving elements 11 interact with the pack 4, the pack 4 is accelerated towards the chute 9. Therefore, a gap is created between the pack 4 that has been pushed by the driving elements 11 and the pack 4 positioned immediately upstream.

Owing to this gap, the guiding plate 17 can be moved from the work position W to the discarding position, and then back to the work position W, so as to allow removal of a single pack 4. In this way, the efficiency of the packaging machine is highly improved. In a high speed packaging machine, for example producing more than 24.000 packages per hour, it would not be possible to discard only one pack if the packs were not accelerated by the driving elements.

The speed of the packs coming from the forming unit, in fact, is too low to allow the guiding plate to move back to the work position without interacting with the packs following the one being discarded. In this way, more than one pack is wasted, so negatively affecting the productivity of the packaging machine.

In other word, owing to the impulse transmitted by the driving elements 11 to the pack 4—and to the gap generated by said impulse—it is possible to have a very fine and precise control of the discarding process also in high speed filling machines.

Figure 4:
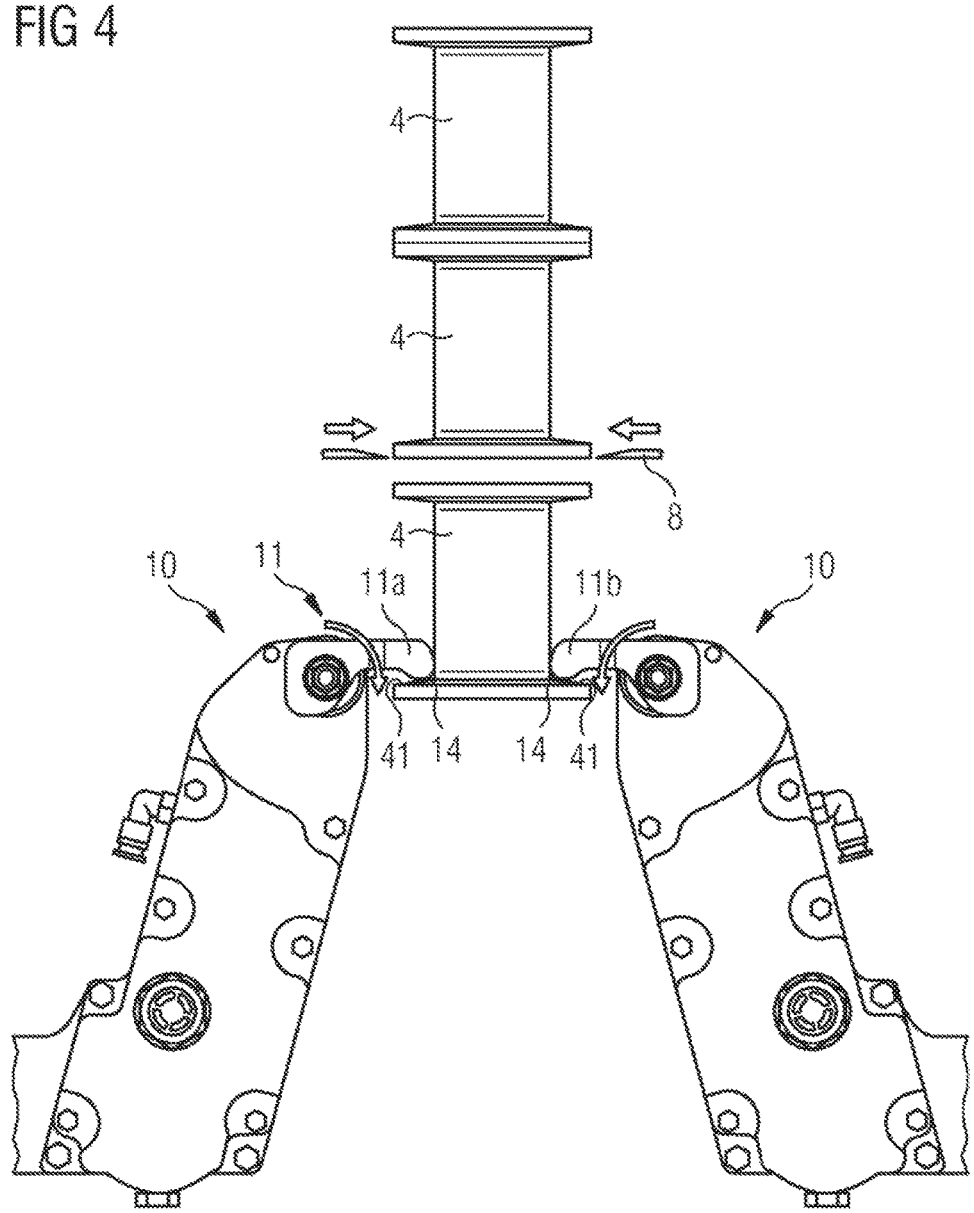
FIG. 4 is front view of another embodiment of a driving arrangement of the feeding unit of FIG. 1.
Figure 5:
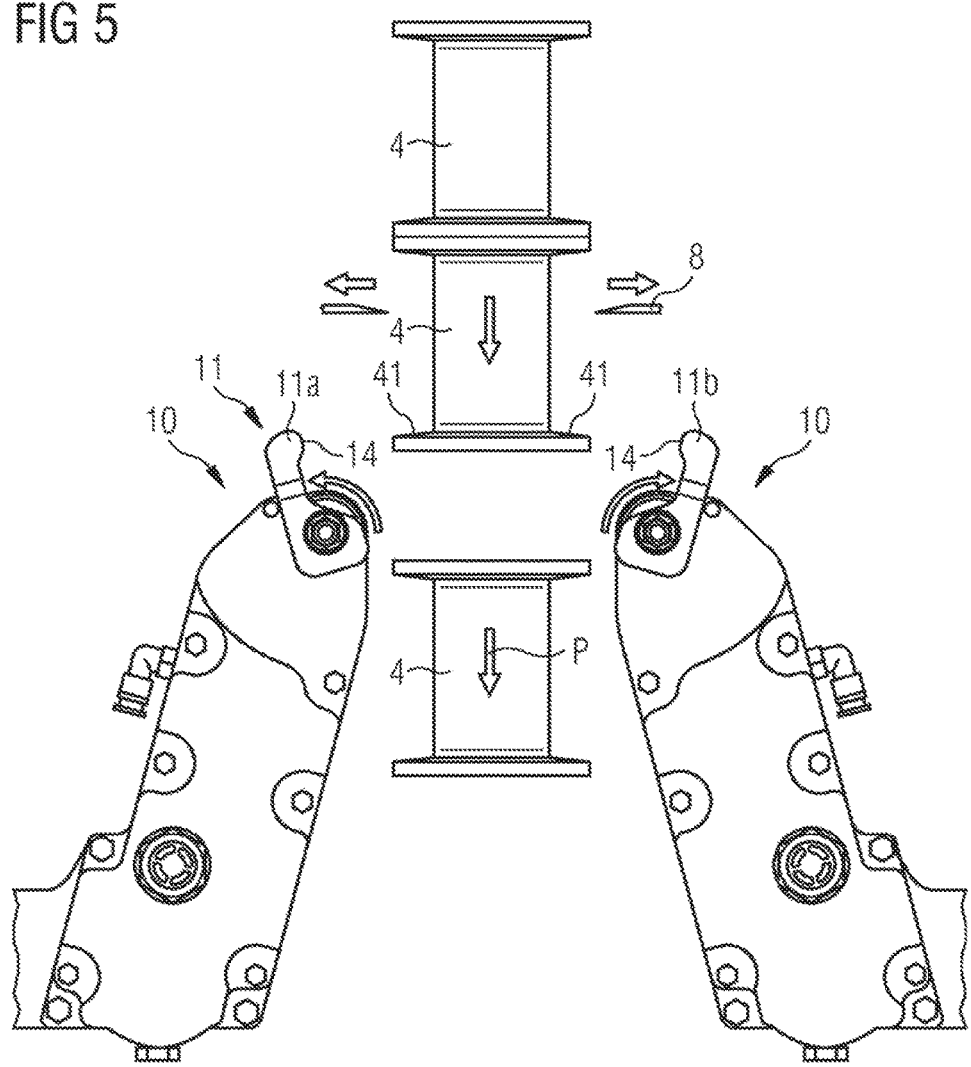
FIG. 5 is a front view showing the driving arrangement of FIG. 4 in a different operating position.

With reference to FIGS. 4 and 5, another embodiment of the driving arrangement 10 is shown.

The embodiment of FIGS. 4 and 5 is similar to the embodiment of FIGS. 1 and 2 and is disclosed only to the extent it differs from the embodiment of FIGS. 1 and 2. The same numeral references are used for the same parts and components.

In this embodiment, the driving elements 11 comprise the active regions 14, but are not provided with the active surfaces 15.

The driving elements 11, therefore, transmit an impulse to the packs 4, but substantially do not guide—or only guide for a short stroke—the packs 4.

Figure 6:
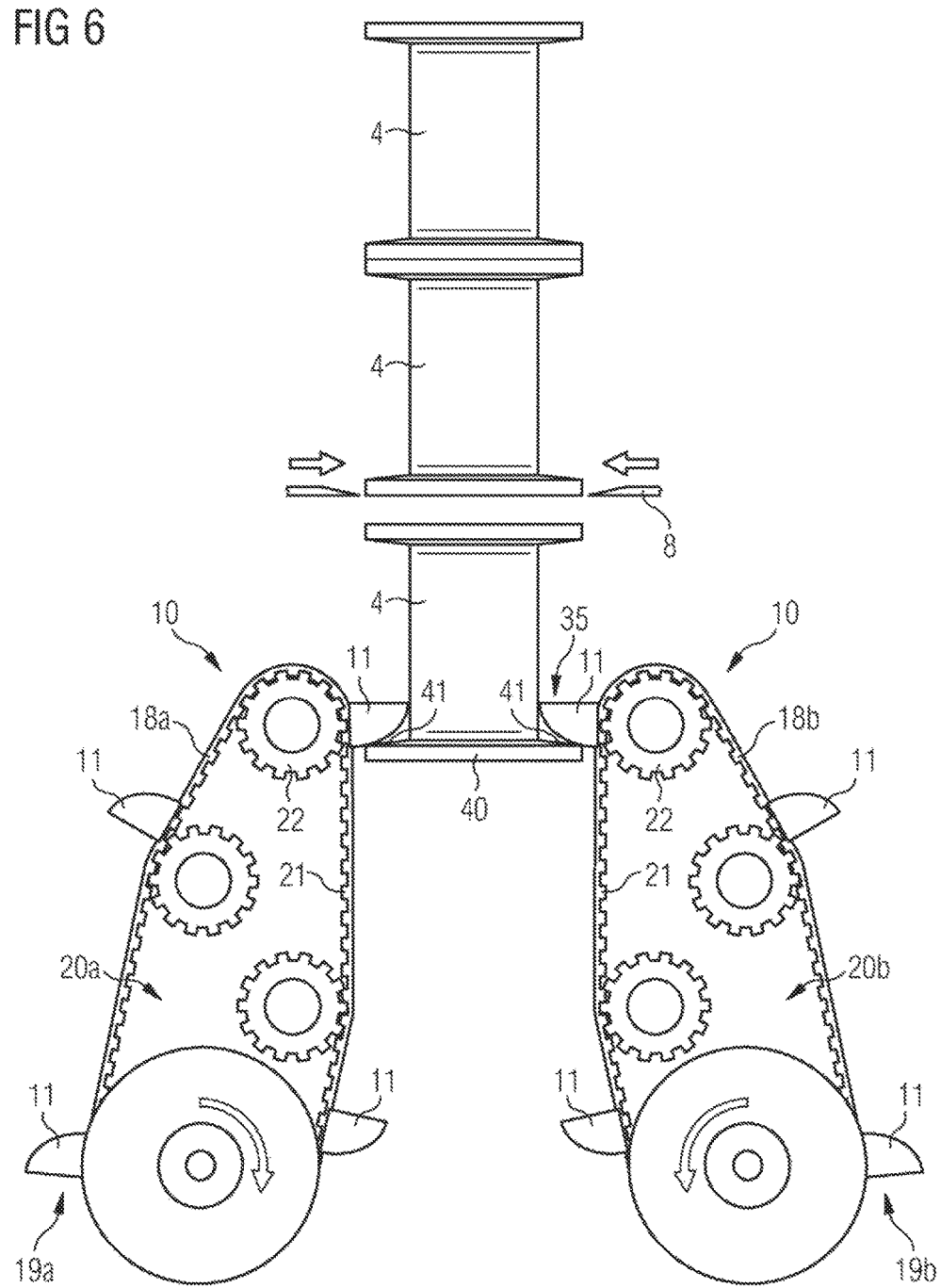
FIG. 6 is front view of a further embodiment of a driving arrangement of the feeding unit of FIG. 1.
Figure 7:
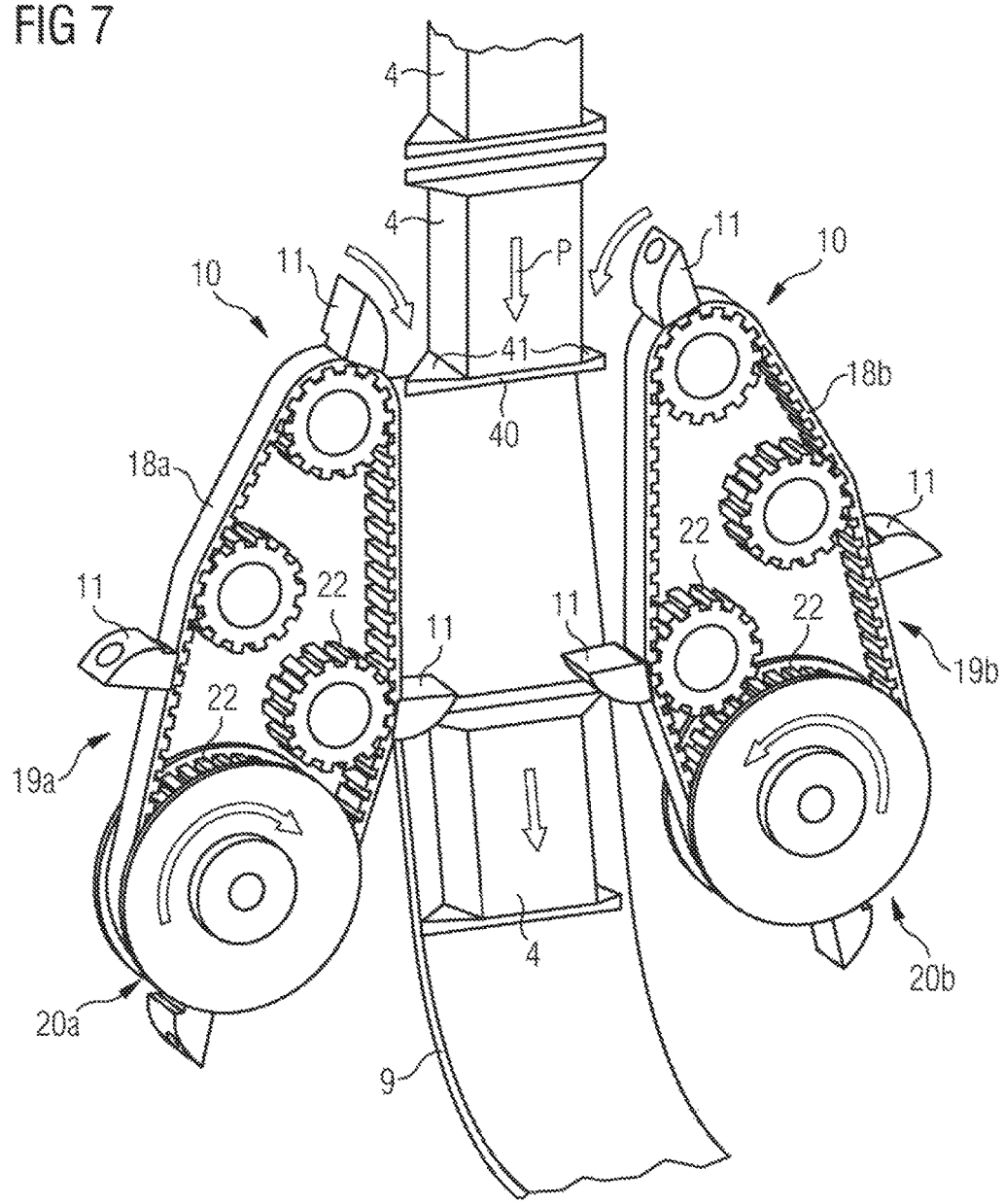
FIG. 7 is a perspective front view showing the driving arrangement of FIG. 6 in a different operating position.

With reference to FIGS. 6 and 7, another embodiment of the driving arrangement 10 is shown.

In this embodiment the driving arrangement 10 comprises a couple of groups of cyclically movable driving elements 11 positioned on opposite sides of the advancing path P.

The actuating arrangement 12 comprises a first flexible actuating element 18a and a second flexible actuating element 18b arranged on opposite sides of the advancing path P. In the embodiment shown, the first flexible actuating element 18a and the second flexible actuating element 18b are toothed belts 21.

The first flexible actuating element 18a carries a first group 19a of driving elements 11. The driving elements 11 of the first group 19a are equally spaced on the first flexible actuating element 18a.

The second flexible actuating element 18b carries a second group 19b of driving elements 11. The driving elements 11 of the second group 19b are equally spaced on the second flexible actuating element 18b.

The first flexible actuating element 18a has the shape of a loop and is partially wound around a first set of wheels 20a.

The second flexible actuating element 18a has the shape of a loop and is partially wound around a first set of wheel 20a.

In the embodiment shown the first set of wheels 20a and the second set of wheel 20b comprise toothed wheels 22 meshing with the toothed belts 21.

The first set of wheels 20a and the second set of wheels 20b rotate about respective rotation axes. The rotation axes are substantially horizontal.

One of the wheels of the first group of wheels 20a is driven by a first motor device (not shown).

One of the wheels of the second group of wheels 20b is driven by a first second motor device (not shown).

The first motor device and the second motor device are synchronized so that a driving element 11 of the first group 19a and a corresponding second driving element 11 of the second group 19b interact with the pack 4 substantially at the same time.

As an alternative, a single motor device can rotate one of the wheels of the first group of wheels 20a and one of the wheels of the second group of wheels 20b through a transmission.

During operation, the driving elements 11 pulls down the packs 4 interacting with the second flaps 41 and pushes the packs 4 along the advancing path P.

Figure 8:
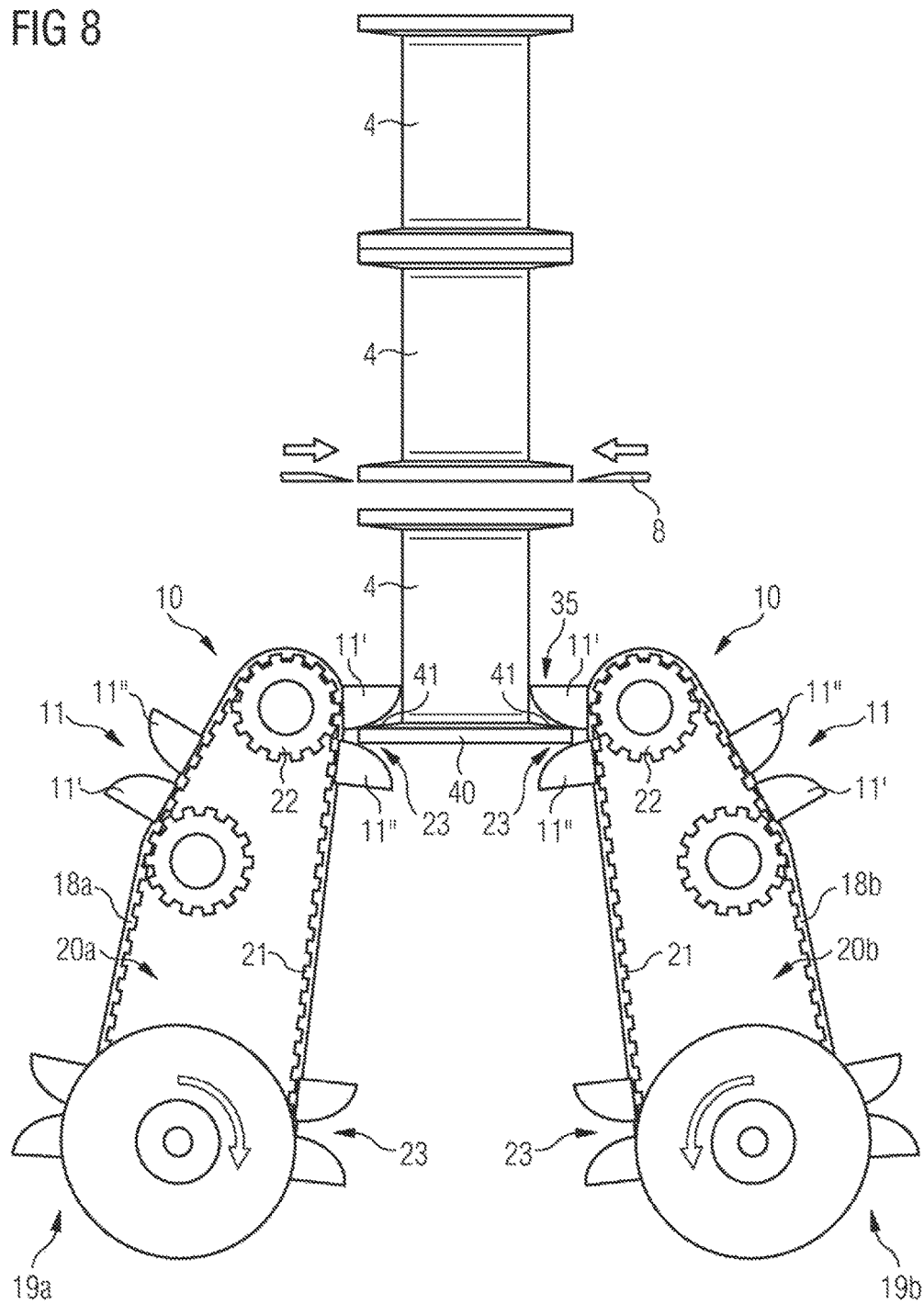
FIG. 8 is front view of a still further embodiment of a driving arrangement of the feeding unit of FIG. 1.
Figure 9:
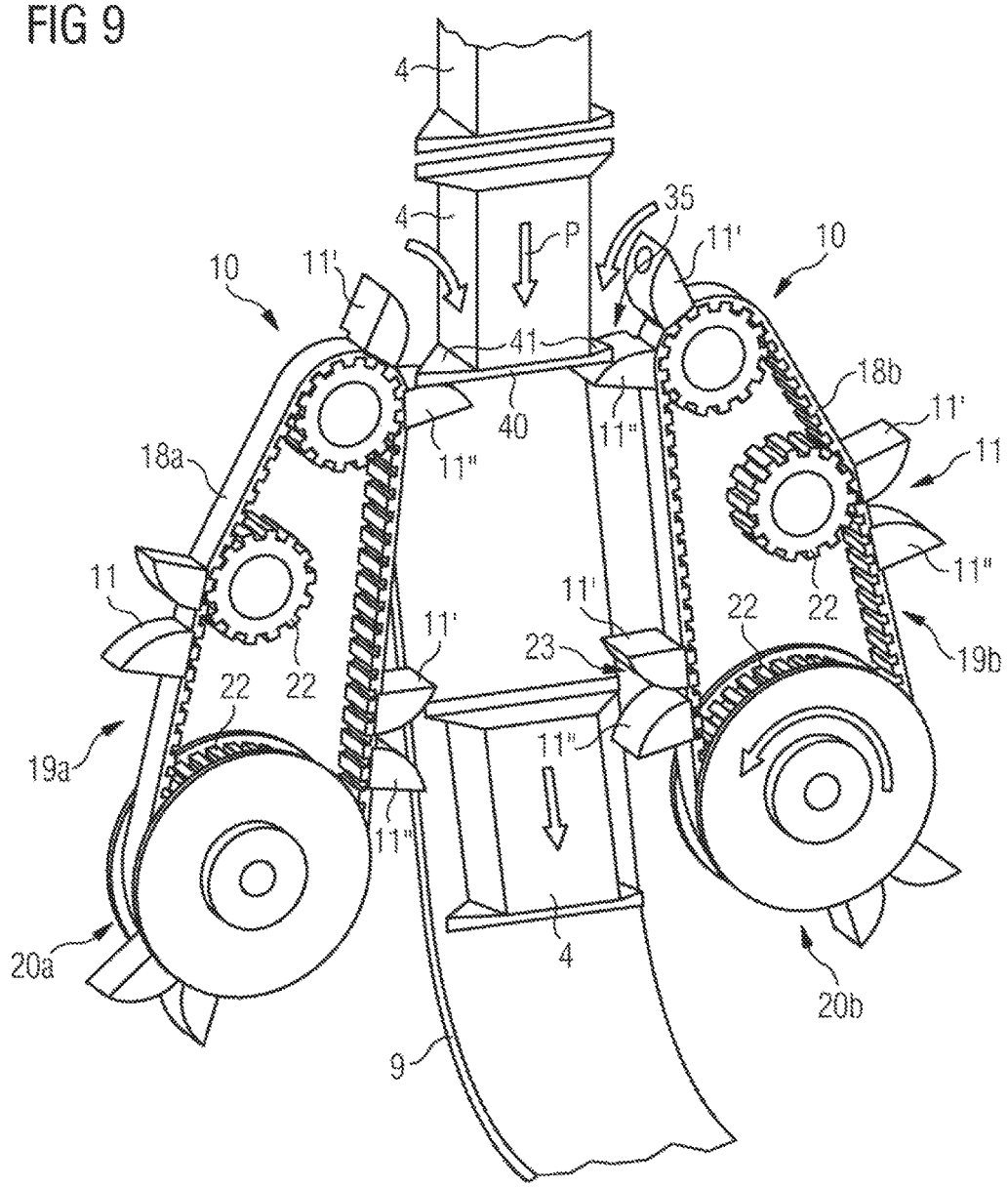
FIG. 9 is a perspective front view showing the driving arrangement of FIG. 8 in a different operating position.

With reference to FIGS. 8 and 9, another embodiment of the driving arrangement 10 is shown.

The embodiment of FIGS. 8 and 9 is similar to the embodiment of FIGS. 6 and 7 and is disclosed only to the extent it differs from the embodiment of FIGS. 6 and 7. The same numeral references are used for the same parts and components.

In this embodiment, both the first flexible actuating element 18a and the second actuating element 18b carry a plurality of couples of driving elements 11.

Each couple of driving elements comprises a first driving element 11' and a second driving element 11'.

During operation, the first driving elements 11' pulls down the packs 4 interacting with the second flaps 41, whilst the second driving elements 11" contacts the second end fin 40. Therefore, the second flaps 41 and the second end fin 40 are received in seats 23 defined between the first driving elements 11' and the second driving elements 11".

In this way, the first driving elements 11' and the second driving elements 11" guide the pack 4 along the advancing path P.

Clearly, changes may be made to the feeding unit 3 as described and illustrated herein without, however, departing from the scope defined in the accompanying claims.

The invention claimed is:

1. A feeding unit for receiving sealed packs of pourable food products from a forming unit arranged to form said packs and feed said packs to a folding unit arranged to fold said packs so as to obtain folded packages, said feeding unit comprising a feeding conveyor to carry said packs towards said folding unit, a driving arrangement interacting with said packs so as to pull said packs from said forming unit and push said packs towards said feeding conveyor, said driving arrangement comprising at least two cyclically movable driving elements positioned on opposite sides of an advancing path along which said packs are advanced through said feeding unit and an actuating arrangement for moving said driving elements, said driving elements being arranged to interact with opposite portions of said packs, said driving elements being configured to interact with flaps of said packs projecting from opposite lateral walls of said packs.

2. A feeding unit according to claim 1, wherein said actuating arrangement moves said driving elements, at least during interaction of said driving elements with said packs, at a driving speed greater than a releasing speed at which said packs are released from said forming unit.

3. A feeding unit according to claim 1, wherein said actuating arrangement comprises two rotatable bodies, said rotatable bodies being positioned on opposite sides of said advancing path, each of said rotatable bodies carrying at least one of said driving elements.

4. A feeding unit according to claim 1, wherein said actuating arrangement comprises two movable flexible actuating elements, said flexible actuating elements being positioned on opposite sides of said advancing path, each of said flexible actuating elements carrying at least one of said driving elements.

5. A feeding unit according to claim 4, wherein each of said flexible actuating elements carries a group of said driving elements, said driving elements being equally spaced on said flexible actuating elements.

6. A feeding unit according to claim 4, wherein each of said flexible actuating elements carry a plurality of couples of driving elements, said couples of driving elements being equally spaced on said flexible actuating elements.

7. A feeding unit according to claim 6, wherein each couple of driving elements comprises a first driving element and a second driving element, a seat being defined between said first driving element and said second driving element, said seat being arranged to receive, in use, an end portion of one of said packs to guide said packs.

8. A method comprising:
cutting a plurality of connected sealed packs of pourable food products that have been formed in a forming unit and that are moving along a vertically downward advancing path to separate the plurality of sealed packs of pourable food products into a plurality of individual sealed packs of pourable food products;
applying an advancing force to each successive one of the plurality of individual sealed packs of pourable food products by contacting the individual sealed packs of pourable food products with two movably driven and cyclically movable driving elements positioned on opposite sides of the advancing path at positions downstream of the cutting, the driving elements being movably driven by an actuating arrangement, the applying of the advancing force accelerating each of the of the plurality of individual sealed packs of pourable food products towards a chute, the driving elements interacting with opposite portions of the packs and interacting with flaps of the packs projecting from opposite lateral walls of the packs;
feeding the individual sealed packs of pourable food products from the chute to a feeding conveys which conveys the individual sealed packs of pourable food products; and
folding the individual sealed packs of pourable food products fed by the feeding conveyor.

9. The method according to claim 8, wherein the two movably driven driving elements are rotated at a rotating speed greater than an advancing speed at which the individual sealed packs of pourable food products move under gravity.

10. The method according to claim 8, wherein the driving elements contact opposite portions of the individual sealed packs of pourable food products.

11. The method according to claim 8, wherein each of the individual sealed packs of pourable food products includes a plurality of lateral walls extending between opposite end portions of the individual sealed packs of pourable food products, each of the end portions of the individual sealed packs of pourable food products including a rectangular end fin and two triangular flaps, the driving elements contacting the triangular flaps at a lower end of the individual sealed packs of pourable food products.

12. The method according to claim 8, wherein each of the individual sealed packs of pourable food products includes a plurality of lateral walls extending between opposite end portions of the individual sealed packs of pourable food products, each of the end portions of the individual sealed packs of pourable food products including a rectangular end fin and two triangular flaps, the driving elements each including one portion that contacts one of the lateral walls of the individual sealed packs of pourable food products and another portion that contacts one of the triangular flaps at a lower end of the individual sealed packs of pourable food products.

13. A feeding unit for receiving sealed packs of pourable food products from a forming unit arranged to form the packs and feed the packs to a folding unit arranged to fold the packs to obtain folded packages, the feeding unit comprising:
a feeding conveyor to carry the packs towards the folding unit;
a driving arrangement interacting with the packs to pull the packs from the forming unit and push the packs towards the feeding conveyor;
the driving arrangement comprising at least two cyclically movable driving elements positioned on opposite sides of an advancing path along which the packs are advanced through the feeding unit and an actuating arrangement for moving the driving elements, the driving elements being arranged to interact with opposite portions of the packs, the driving elements generating an impact on the packs and accelerating the packs toward the feeding conveyor.

14. A feeding unit according to claim 13, wherein said driving elements are configured to interact with flaps of said packs projecting from opposite lateral walls of said packs.

15. A feeding unit according to claim 13, wherein the actuating arrangement comprises two rotatable bodies positioned on opposite sides of the advancing path, each of the rotatable bodies carrying at least one of the driving elements.

16. A feeding unit according to claim 13, wherein the actuating arrangement comprises two movable flexible actuating elements positioned on opposite sides of the advancing path, each of the flexible actuating elements carrying at least one of the driving elements.

17. A feeding unit according to claim 16, wherein each of the flexible actuating elements carries a group of the driving elements, the driving elements being equally spaced on the flexible actuating elements.

18. A feeding unit according to claim 16, wherein each of the flexible actuating elements carries a plurality of the driving elements, the plurality of driving elements carried on each flexible actuating element being equally spaced apart on the flexible actuating element.

19. A feeding unit according to claim 18, wherein the plurality of driving elements carried on each flexible actuating element includes a first driving element and a second driving element, a seat being defined between the first driving element and the second driving element, the seat being arranged to receive, in use, an end portion of one of the packs to guide the pack.

* * * * *